Figure 1:
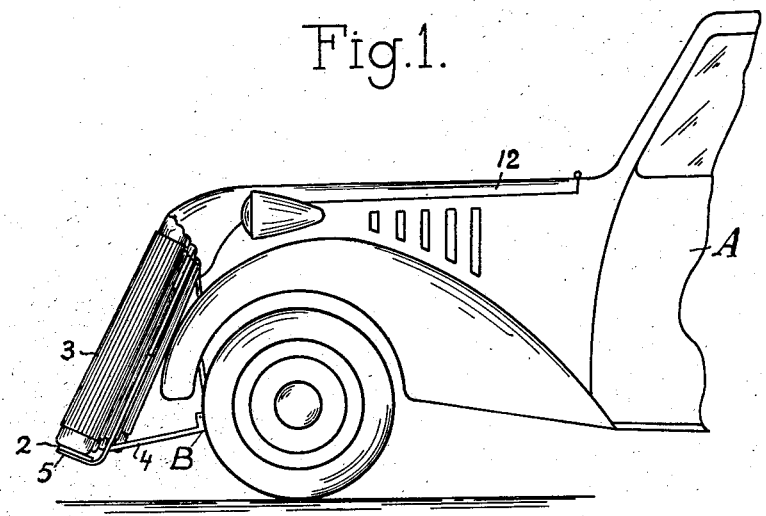

June 17, 1941. S. H. BANG 2,245,746
COWCATCHER FOR AUTOMOBILES
Filed Jan. 15, 1940 2 Sheets-Sheet 1

Inventor:
S. H. Bang
By F. E. Boyce.

June 17, 1941.    S. H. BANG    2,245,746
COWCATCHER FOR AUTOMOBILES
Filed Jan. 15, 1940    2 Sheets-Sheet 2
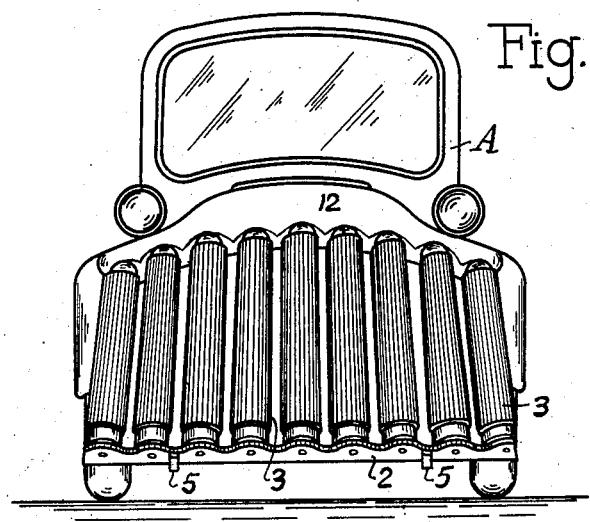
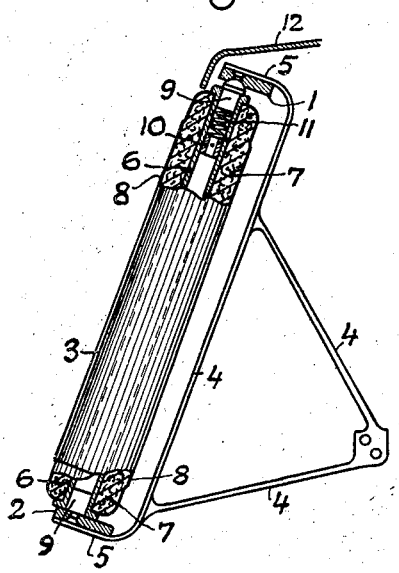
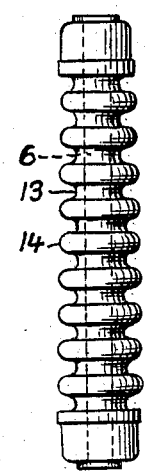
Inventor:
S. H. Bang
By G. E. Boyce Patented June 17, 1941

2,245,746

UNITED STATES PATENT OFFICE 2,245,746

COWCATCHER FOR AUTOMOBILES

Sóren Hansen Bang, Copenhagen, Denmark

Application January 15, 1940, Serial No. 313,951
In Denmark January 31, 1939

2 Claims. (Cl. 293—55)

The heretofore commonly used cow-catchers for automobiles consist mainly of a steel rail curved forward and attached to the front part of the underframe at about the level of the wheel axles, or of two such rails running parallel and disposed above one another. The said cow-catchers have mainly had for their object to protect the carriage itself against serious injury in consequence of driving against fixed objects or against a vehicle moving in the opposite direction, while on the other hand evidently no attention has been paid to the prevention of serious bodily injury by a softening of the blow to which a person hit by the automobile is exposed.

We certainly also known, cow-catchers for automobiles of the type known from locomotives with deflecting members extending between an upper narrower and a lower wider supporting rail curving forward, but even in these cow-catchers, and even if the said deflecting members have been constructed as rotary rollers, no due regard has been paid to the welfare of the persons hit, as the cow-catcher has been of such a small height, and the deflecting members have been made from such a hard material that the person who is hit and, by the collision, has his legs raised from the ground and his body, at the next moment, virtually flung against the front part of the rapidly moving automobile, will certainly be badly injured by the deflecting members themselves as well as by the parts of the front portion of the automobile that extend up above the cow-catcher.

The present invention has for its object to remedy the said drawbacks in automobile cow-catchers of the last mentioned type by giving the rotatable rollers such a height that they cover the entire front of the vehicle, and by upholstering the rollers with rubber sponge, hairlock or the like in such a thickness that the rollers are enabled to absorb the blow from a person hit, without the upholstering becoming compactly compressed thereby, it being noted that the blow owing to the position of the rollers, will be distributed over several rollers, and will become mitigated owing to the rotation performed at the same time by the rollers, because their arched position will cause the person to receive a lateral motion causing him to be moved sideways on the said rotating support and, finally, to be discharged outside of the vehicle track.

The cow-catcher in this construction is also fully able to protect the vehicle itself against damage due to driving against fixed objects, or to collisions with a vehicle moving in the opposite direction.

One construction of an automobile cow-catcher according to the invention is shown by way of example on the drawings.

Fig. 1 shows, in side elevation, the front part of an automobile fitted with a cow-catcher, the latter however in central vertical section.

Figure 2:
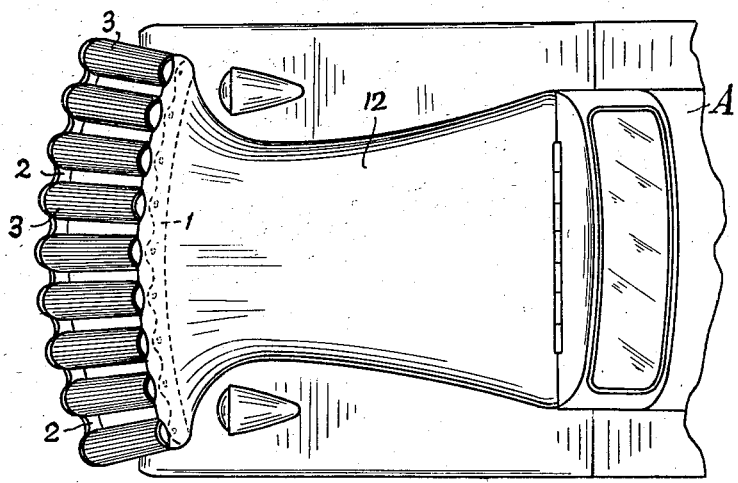

Fig. 2 the same part of an automobile with cow-catcher, in plan view,

Fig. 3 the automobile with cow-catcher, in front elevation,

Fig. 4 a central vertical section of the cow-catcher itself, showing at the same time certain details of the construction and journalling of the rollers, and Fig. 5 a modified construction of the central rollers in the cow-catcher.

A is the automobile on the front part of the underframe B of which (see Fig. 1) the cow-catcher is attached. As mentioned above, the cow-catcher is of the type known from locomotives, and it has an upper narrower and a lower wider supporting rail 1 and 2, respectively (see especially Fig. 4) which rails are curving forward and support between them the deflecting members shaped as rotary rollers 3 tilting rearward and slightly towards the central plane of the vehicle. The supporting rails 1 and 2 are disposed in such a manner, and the rollers 3 are of such a height that the latter will cover practically the entire front of the automobile. The entire cow-catcher is supported by a supporting frame attached to the underframe B and being for instance, as shown in Fig. 4, formed as two brackets 4 with arms 5 extending forward and serving to support the rails 1 and 2.

Each of the rollers consists of a solid core, preferably as shown in Fig. 4 in the shape of a steel tube 6 and, covering the same, an upholstering 7 of rubber sponge, hairlock or other pressure-elastic material, which upholstering preferably is encircled again by a mantle 8 of compact rubber or the like which for the sake of appearance should preferably be corrugated on the longer central part of the roller. The thickness of the upholstering 7 is selected in such a manner that the rollers, as mentioned above, will be able to take up the blow from a hit person, without the upholstering becoming compressed compactly for that reason.

In the construction shown, the rollers 3 are rotatable about pivot pins 9, see Fig. 4, which are attached to the rails 1 and 2, and extend somewhat into the ends of the core tubes 6 of the rollers. In order that the rollers may not rotate automatically during the driving, but still may not be prevented from rotating when actuated from the outside, a helical spring 11 is inserted in compression at the end of one of the pivot pins 9, between the latter and a bushing 10 fixed in the tube, a certain distance from the end.

The upper roller-supporting rail 1 and the connection between the latter and the rollers is preferably covered by the front part of the flap 12 of the engine casing which flap is hinged about its rear edge, and has its front edge bent down over the top of the rollers and adjusted so as to fit the same.

As the rollers to some extent prevent the access of air to the radiator of the automobile, a screen pointing obliquely downward and forward may preferably be attached to the supporting frame of the cow-catcher, as during the driving such a screen will catch the air and direct the same upward toward the radiator.

An access of air to the radiator, however, may also be provided by constructing the two or three central rollers of the cow-catcher as shown in Fig. 5 in which the upholstering with its mantle is replaced by a rubber pipe 13 encircling the core tube 6 and being fitted with heavy annular rubber ribs 14.

If desired, the rails 1 and 2 may be covered with rubber, or they may be upholstered in a similar manner as the rollers.

The cow-catcher may be mounted in such a manner that in the case of collision (pressure from the front) the cow-catcher will move downward towards the road surface, or that it may be given such a motion from the driver's seat.

Having thus described my invention, what I claim is:

1. A cowcatcher for automobiles, comprising an upper forwardly curved supporting rail and a lower forwardly curved supporting rail, the curvature of the upper rail being smaller than that of the lower rail, means for supporting said rails on the underframe of an automobile in spaced relation to each other, a plurality of exteriorly padded rollers mounted at their opposite ends for rotation in said rails, the rollers being of such height as to cover the entire front end of the vehicle, and tension means within each of said rollers to restrain them from rotation during normal operation of the vehicle.

2. A cowcatcher for automobile, comprising an upper forwardly curved supporting rail and a lower frwardly curved supporting rail, the curvature of the upper rail being smaller than that of the lower rail, means for supporting said rails on the underframe of an automobile in spaced relation to each other, each of said rails having a plurality of pintles, the pintles of one rail being disposed in opposing relation to those of the other rail, tubular members rotatably engaging at their opposite ends the pintles of the respective rails, each of said tubular members having a bushing secured therein at a predetermined distance from one end thereof, and a helical spring disposed in the tubular member and compressed between said bushing and the rail pintle at that end thereby to resist rotation of the tubular member during normal operation of the vehicle, said tubular members being exteriorly padded and of such height as to cover the entire front of the vehicle.

SÖREN HANSEN BANG.